United States Patent [19]
Aoki et al.

[11] 3,923,571
[45] Dec. 2, 1975

[54] METHOD OF USING AN EPOXY-RESIN-IMIDAZOLE SOLDER MIXTURE

[75] Inventors: Hiroyuki Aoki, Yokosuka; Takeshi Mottate; Masao Nakajima, both of Yokohama; Kadru Ebisui, Takatsuki; Satoshi Nishikawa, Osaka, all of Japan

[73] Assignees: Nissan Motor Company Limited, Yokohama; Sunstar Chemical Industry Co., Ltd., Takatsuki, both of Japan

[22] Filed: Mar. 14, 1973

[21] Appl. No.: 341,011

Related U.S. Application Data

[62] Division of Ser. No. 212,694, Dec. 27, 1971, abandoned.

[30] Foreign Application Priority Data

Dec. 27, 1970  Japan............................... 45-127867
Dec. 27, 1970  Japan............................... 45-127868
Dec. 27, 1970  Japan............................... 45-127869

[52] U.S. Cl................... 156/94; 156/230; 156/289; 156/330; 260/2 EN; 260/2 N; 260/37 EP; 260/47 EN; 427/146; 428/414; 428/418; 428/914

[51] Int. Cl.$^2$...................... B32B 35/00; B44C 1/20

[58] Field of Search ............. 156/230, 330, 289, 94; 161/184, 186, 406; 260/2 EN, 37 EP, 47 EN, 2 N; 296/1 A; 117/3.1

[56] References Cited
UNITED STATES PATENTS

| | | | |
|---|---|---|---|
| 3,256,135 | 6/1966 | Weinheimer et al. .............. | 161/185 |
| 3,326,741 | 6/1967 | Olson.................................. | 161/184 |
| 3,329,652 | 7/1967 | Christie........................... | 161/185 X |
| 3,377,227 | 4/1968 | Whalen............................. | 156/242 |
| 3,470,048 | 9/1969 | Jones.................................... | 156/94 |
| 3,488,212 | 1/1970 | MacIntosh et al. ................... | 117/75 |
| 3,489,695 | 1/1970 | Green................................ | 260/2 N |
| 3,507,831 | 4/1970 | Avis et al............................. | 260/47 |
| 3,598,616 | 8/1971 | Gibson et al......................... | 106/14 |
| 3,642,698 | 2/1972 | Green.................................. | 260/47 |
| 3,723,223 | 3/1973 | LeCompte........................... | 156/313 |
| 3,756,984 | 9/1973 | Klaren et al..................... | 260/47 EC |
| 3,792,016 | 2/1974 | Hill et al......................... | 260/47 EN |

*Primary Examiner*—Charles E. Van Horn
*Assistant Examiner*—Robert A. Dawson
*Attorney, Agent, or Firm*—Sughrue, Rothwell, Mion, Zinn & Macpeak

[57] ABSTRACT

An epoxy resin composition comprising an epoxy resin and a normally solid imidazole compound having a long-chain alkyl group especially at the 2-position of the imidazole ring, such as 2-n-heptadecyl imidazole, with or without a curing agent or catalyst, and/or an inorganic anti-corrosive pigment such as red lead or strontium chromate. The composition has superior storage stability at room temperature, and is rapidly heat-curable at a relatively low temperature. One of the typical applications of the composition is in the soldering of automobile bodies where the composition is preferably used in a sheet form to give good surface finish.

6 Claims, No Drawings

METHOD OF USING AN EPOXY-RESIN-IMIDAZOLE SOLDER MIXTURE

This is a division of application Ser. No. 212,694, filed Dec. 27, 1971, and now abandoned.

This invention relates to a heat-curable one-part epoxy resin composition, and more specifically, to an epoxy resin composition comprising an epoxy resin and a normally solid imidazole compound having a long-chain alkyl group with at least 15 carbon atoms in combination, if desired, with a curing agent or catalyst and/or an anti-corrosive pigment.

Organic polyamines, organic polybasic acids, and their anhydrides are among known curing agents for epoxy resins, and are used in great quantities in a variety of fields including those relating to paints, adhesives, and castings. These curing agents, however, have the property of reacting with, and curing, epoxy resins at room temperature, and compositions comprising epoxy resins and these curing agents cannot be free from an operational restriction of pot life. Furthermore, such compositions have the defect of causing various difficulties in operations required for weighing and mixing the epoxy resins and curing agents, or those ascribable to the qualities of the curing agents used.

The so-called one-part composition comprising a blend of an epoxy resin and a curing agent designed to exhibit storage stability at room temperature for prolonged periods of time can be obtained by enclosing a curing agent or catalyst, such as the polyamines or organic acids, which cures an epoxy resin at room temperature by the microencapsulating or molecular sieve chemical loading method, thereby to stabilize it so as not to react with the epoxy resin at room temperature. This method, however, meets with a number of technical and economical difficulties, and is hardly feasible. One-part epoxy resin compositions can also be obtained by using high temperature active curing agents or catalysts, such as dicyandiamide, N,N-diallylmelamine, 4,4'-diaminodiphenylsulfone or boron trifluoride/amine adduct, which never, or hardly, react with epoxy resins at room temperature and react with them at high temperatures. However, those having good storage stability require high temperatures and prolonged periods of time for curing, and those which can be cured at lower temperatures for shorter periods of time have poor storage stability at room temperature. Moreover, the latter have further disadvantages such as susceptibility to a humid atmosphere, corrosive action on metals, or strong toxicity. Hence, these one-part epoxy resin compositions similarly have not found feasible applications in various industrial fields.

Accordingly, an object of this invention is to provide a heat-curable one-part epoxy resin composition which is stable at room temperature for a long period of time and rapidly curable by heating at a relatively low temperature, and which gives a cured product having superior mechanical, electrical and chemical properties and economic versatility.

Another object of this invention is to provide a tacky and plastic epoxy resin composition especially suited for use in applying to such a material as automobile bodies for bonding and soldering purposes.

Still another object of this invention is to provide an epoxy resin composition having good anti-corrosive properties on iron and iron alloys (steel sheet, for example) in bonding and soldering purposes which maintains the desired bond strength and outer finish over prolonged periods of time under high temperature high humidity conditions.

Still another object of this invention is to provide an epoxy resin composition which proves very effective for improving the irregularities of outer surfaces such as roughening or delustering which especially pose a problem in soldering automobile bodies.

A further object of this invention is to provide a process for soldering by means of a shaped article of a tacky and plastic epoxy resin composition.

According to the invention, there is provided a heat-curable epoxy resin composition comprising an epoxy resin and a normally solid imidazole compound having a long-chain alkyl group with at least 15 carbon atoms expressed by the formula

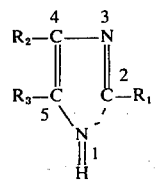

wherein $R_1$, $R_2$ and $R_3$ are a hydrogen atom or a hydrocarbon group, and at least one of $R_1$, $R_2$, and $R_3$ is a long-chain alkyl group having at least 15 carbon atoms.

The imidazole compound used in the invention is solid at room temperature, and is substantially incompatible with an epoxy resin at room temperature. Hence, even when it is mixed with an epoxy resin, reaction does not take place between them over prolonged periods of time. By heating such epoxy resin composition to a temperature of at least 80°C., preferably at least 100°C., the imidazole compound is rapidly dissolved in the epoxy resin, and exhibits a curing action equivalent to those imidazole compounds used in formulating two-part epoxy resin compositions, which are compatible with epoxy resins at room temperature.

The preferred imidazole compounds used in the invention are those of the above formula in which $R_1$ is a long-chain alkyl group having at least 15 carbon atoms. Examples of these compounds include 2-n-pentadecyl imidazole, 2-n-heptadecyl imidazole, 2-n-nonadecyl imidazole, 2-n-heneicosyl imidazole, 2-n-heptadecyl-4-methyl imidazole, or mixtures of these. These 2-long chain alkyl substitution products or 4-alkyl substitution products thereof can be easily prepared economically by dehydrocondensation and dehydrogenation of, for example, ethylene diamine or alkyl-substituted ethylene diamines with higher saturated fatty acids.

The heat-curable, one-part epoxy resin composition of the invention is obtained by uniformly dispersing the normally solid imidazole compound in a finely divided form in a liquid or solid powdery epoxy resin in a manner known per se. The resulting composition can be stored stably for a long period of time at room temperature and under exposure to the atmosphere and cured at an elevated temperature of a wide range with great rapidity. It can also be cured in a lower temperature range which has previously been impossible.

Japanese Pat. Publication Nos. 754/66, 755/66, and 11500/67 already disclose that imidazole compounds of the above formula having a hydrocarbon or substituted hydrocarbon group having less than 15 carbon atoms can be used as curing agents for epoxy resins, and preferably, such hydrocarbon group has 10 or less carbon atoms. These imidazole compounds, however, are compatible with epoxy resins at room temperature or a slightly elevated temperature, and preferably in the liquid state. The epoxy resin compositions obtained by using these imidazole compounds belong to the so-called two-part resin composition, although having longer pot lives than epoxy resin compositions containing aliphatic amines as curing agents.

Normally solid imidazole compounds containing a lower alkyl group or an aromatic hydrocarbon group, such as imidazole (m.p. 90°C.), 2-methyl imidazole (m.p. 137°C.), 2-phenyl imidazole (m.p. 148°C.), or 2-4-dimethyl imidazole (m.p. 92°C.), have a far higher melting point than, for example, 2-n-heptadecyl imidazole (m.p. 88°C.), but exhibit a high solubility in epoxy resins at room temperature and a high rate of dissolution as well as a markedly high rate of reaction. Hence, thesee imidazole compounds have short pot lives, and cannot be incorporated in one-part epoxy resin compositions.

The imidazole compounds used in the invention which have long-chain alkyl groups with at least 15 carbon atoms are solid compounds which have poor compatibility with epoxy resins at room temperature. When uniformly dispersed in finely divided form in an epoxy resin, this imidazole compound does not react with the epoxy resin at room temperature, but rapidly dissolves uniformly in the epoxy resin at the melting point of the imidazole compound or at a lower temperature; simultaneously, the reaction between the imidazole and the epoxy resin rapidly proceeds to give a homogeneous cured product.

The epoxy resins that can be used in the invention have at least one epoxy group per molecule on an average, and include, for example, glycidyl ethers of polyhydric phenols such as bisphenol A or resorcinol, polyhydric alcohols such as glycerol or polyalkylene glycols, or of novolak or resol obtained by condensation of phenol with formaldehyde; polyglycidyl esters of polymers of unsaturated fatty acids; or epoxy compounds of unsaturated fatty acid esters.

The epoxy resin composition may also include an ordinary curing agent or catalyst which is active at high temperatures. By this, the curing temperature of the curing agent or catalyst can be drastically decreased.

The amount of the imidazole compound to be used in the invention varies according to whether it is used alone or in combination with the high temperature active curing agent or catalyst and also according to the equivalent relation between the epoxy resin and the imidazole compound, and the desired curing conditions. But in any case, the amount is in the range of from 1 to 30 parts by weight, preferably 2 to 15 parts by weight, per 100 parts by weight of the epoxy resin.

The particle size of the imidazole compound in the epoxy resin composition exerts some influence on the rate of curing and hence the blending proportion of the imidazole compound, and also has to do with the storage stability of the epoxy resin composition. Generally, the particle size is in the range of 200 $\mu$ to 20 $\mu$, and no appreciable difference is seen with the particle size within this range.

Examples of the curing agent or catalyst used in combination with the imidazole compound of the invention include aromatic polyamines, heterocyclic polyamines, urea derivatives, hydrazides, and organic or inorganic acid salts thereof. Specifically, these are compounds containing a high temperature active hydrogen atom, such as 4,4'-diaminodiphenylmethane, 4,4'-diaminodiphenylsulfone, benzidine, dicyandiamide, urea resin, melamine, melamine resin, N,N'-diallylmelamine, benzoguanamine, or adipic acid dihydrazide, and organic or inorganic acid salts of these. The amount of the curing agent or catalyst is not specifically limited, but usually, 1 to 30 parts by weight of the curing agent or catalyst is used per 100 parts by weight of the epoxy resin.

The conjoint use of such a conventional curing agent or catalyst with the imidazole compound of the invention, first of all, permits a reduction in the amount of the imidazole compound to be added, and brings about a marked decrease in the curing temperature of the curing agent itself. Furthermore, the characteristics of the curing agent itself, such as good adhesion, coating properties, or thermal stability, enhance versatility of the resulting epoxy resin composition in various applications both in respect of performance or economic advantage.

When necessary, various additives can be incorporated in the epoxy resin composition of the invention. Examples of the additives are fillers, pigments, thickner, resins, releasing lubricants, plasticizers, diluents, or solvents. Since the epoxy resin composition of the invention is basically stable or inert to various materials, these additives can be incorporated without special consideration.

The epoxy resin composition described above can be easily prepared by a known method which roughly falls within the following two procedures.

The first of these procedures comprises pulverizing the imidazole compound, curing agent, and if desired, solid epoxy resin each in the form of coarse particles or mass either separately or together by means of a ball mill or edge runner, and mixing the pulverized particles of these components with other ingredients. This procedure can also be used to produce a liquid or paste-like composition. But if all of the ingredients of the composition can be finely divided in the solid state, it is especially suitable for production of a powdery composition by dry blending.

The second procedure is for the preparation of a liquid or paste-like composition, and comprises mixing masses or coarse particles of the imidazole compound, curing agent, etc. with a part or whole of liquid components such as liquid epoxy resin or a plasticizer, and grinding and kneading the mixture by three rolls or a ball mill until it is finely divided, and then mixing the resulting finely divided mixture with other ingredients. When this procedure is employed, it is necessary to control changes in the particle size distribution of the imidazole compound which take place by the grinding and kneading operation. Experiments have shown however that generally, the particle size of the imidazole compound remain within the above-mentioned range of 20$\mu$ to 200$\mu$. Hence, no special consideration is necessary in this respect.

The epoxy resin composition described above in detail has a number of advantages among which are:

1. It possesses good storage stability at room temperature and under exposure to the atmosphere, and exhibits a decreased curing temperature and shorter curing time which are quite unexpected from the conventional knowledge.

For example, the epoxy resin composition of the invention has good storage stability over a period of 3 to 6 months and even longer. It can be curved, for example, within about 50 minutes at 80° to 120°C., and within about 30 minutes at 120° to 150°C. The conventional epoxy resin compositions require a long curing time at a temperature of 150°C. to 200°C. or even higher. Accordingly, the epoxy resin composition of the invention can find applications in uses for which the conventional compositions prove unsuitable, or other new uses, and for curing by heating, a paint baking oven (120°–160°C., 10–30 minutes) can be used with greater suitability.

2. Since in ordinary blending recipes, the compositions of the present invention give cured products having almost equal properties when cured at a temperature within the range of 100° to 250°C., and the properties are retained even when the curing is excessive, it is easy to choose the method and equipment of heat-curing and to control the curing process.

3. The imidazole compound used in the invention has an effect of promoting curing of the epoxy resin by various curing agents or catalyst which are active at elevated temperatures, and serves to lower the curing temperature (generally, 150° to 200°C. or even higher) of the curing agent to a marked extent without impairing the characteristics of the curing agent. Hence, the epoxy resin composition can be modified or given the desired properties by conjointly using the high temperature active curing agent or curing catalyst.

4. Since the imidazole compound is used in a finely divided form, a powdery epoxy resin composition can be prepared, and therefore, powder spraying on powder adhesion is possible using such powdery composition.

5. Since the imidazole compound is chemically insensitive to air, moisture or a variety of other materials, there is no need to place the epoxy resin composition in a sealed place either in storage or in use unless some special ingredients are incorporated in the composition. Moreover, the epoxy resin composition of the invention is hardly likely to exert adverse effects such as erosion or corrosion on other matters which come into contact therewith. Accordingly, the epoxy resin composition of the invention lends itself to easy handling, and has excellent versatility.

6. The amount of the imidazole compound can be small, and it is readily available at relatively low cost. In addition, no special consideration should be given to the preparation of the composition. The composition can therefore be produced with economical advantage.

Because of these advantages, the epoxy resin compositions of the invention find a very wide range of applications including painting, coating, adhering, filling, and casting applications.

One of the typical application of the epoxy resin composition of the present invention is the soldering or "padding" of automobile bodies. For this application, it is preferred that the epoxy resin composition should be fabricated into sheet form prior to application.

Thus, according to the invention, there is also provided a process for soldering an article, which comprises applying to the article to be soldered a fabricated article of a tacky, plastic epoxy resin composition comprising an epoxy resin and a normally solid imidazole compound having a long-chain alkyl group with at least 15 carbon atoms expressed by the formula

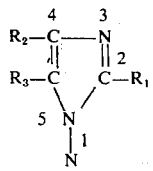

wherein $R_1$, $R_2$ and $R_3$ are a hydrogen atom or a hydrocarbon group, and at least one of $R_1$, $R_2$ and $R_3$ is a long-chain alkyl group having at least 15 carbon atoms, said fabricated article having a strippable backing film on one surface, pressing the fabricated article against the article to be soldered and bringing them into intimate adhesion to each other, extending the fabricated article, and heat-curing it with or without prior removal of the backing film.

Now, the soldering process will be described with special reference to the application of a sheet of said epoxy resin composition to an automobile body.

As is well known, an automobile body is constructed of a number of steel panels, and it is inevitable that joint parts between the panels appear here and there on the outer surface of the body. Various methods have therefore been attempted to finish the body surface into an integrated, beautiful structure. The most common method is the soldering of concave portions such as joint portions using metal solder. Specifically, the body is pre-heated by flame such as one from a burner on an automobile assembly line. On the other hand, a plate-like metal solder consisting of lead and tin is melted by heating, and coated on the desired parts of the pre-heated body using such an instrument as a spatula or iron, followed by extending and cooling. Then, the soldered parts are finished into a smooth, integral structure using a file or a sander such as sandpaper.

The soldering method using metal solder, however, suffers from various disadvantages. First of all, lead as a main component of the solder is toxic to man, and is undesirable for health reasons. Furthermore, since molten solder has good flow ability, it is difficult to coat in a large thickness, and the efficiency of soldering proves poor. Thus, a considerable skill is needed for soldering operations. When soldering is effected on a flat surface of the body, deformation may be formed on the panel surface as a result of the high temperatures at the time of fusing metal solder. Further disadvantage is that tin contained in the solder is very expensive, and that pits occur because of the incorporation in molten solder of fluxes used as adhesion modifiers for the solder to be adhered to steel sheets, which in turn causes pinhole formation, contamination, and erosion on top coats.

In an attempt to overcome these difficulties, automobile manufacturers have investigated various organic compositions which can supersede metal solder, and some of such compositions have been actually used. Nevertheless, there is still much to be desired in respect of working efficiency and performance, and such organic compositions have not yet come into full use on the assembly line of automobile bodies. The conclusive reason for this is that despite the need for great skill in soldering operations, metal solder has good working efficiency and performance. Since metal solder is readily fused by heating and assumes a liquid state of low viscosity, bubbles hardly come into the molten solder, and the solder can be coated and extended in any desired form. It is solidified upon cooling for a very short time on the order of second, and rendered grindable. In addition to the excellent working efficiency and speed, the resulting soldered parts exhibit superior performance such as adhesion or resistance to vibration to furnish feasible finished automobile bodies.

The conventional organic compositions have not been able to cope with the three basic elements of metal solder, that is, good working speed, finish, and properties after soldering.

According to the invention, an epoxy resin composition comprising an epoxy resin and a normally solid imidazole compound having a long-chain alkyl group with at least 15 carbon atoms as described hereinabove is made into a sheet having some tackiness and plasticity. A strippable backing film is superposed on one surface of this sheet-like composition. In use, the sheet is cut to a size corresponding to an area of application, and applied to an automobile body. It is then pressed from above the backing film, and with or without prior removal of the backing film, the coated portions or the steel sheet in the neighborhood thereof are heated by a heat-source such as burners, infrared lamps, or high frequency inducting heating devices. Then, the coated parts are ground and finished to complete soldering.

Hot-melt type organic materials are conceivable as materials having excellent meltability, flowability, spreadability, and stickability which can supersede metal solder, but it is very difficult to use them in view of their balance in performance. Investigation revealed that epoxy resin compositions are preferred from the standpoint of performance, but the conventional two-part epoxy resin compositions lend themselves to difficult handling and are not feasible from the standpoint of quality control and equipment cost in line operation. Paste-like epoxy resin compositions, on the other hand, stick to an instrument such as a spatula or iron at the time of coating them on an automobile body and extending them, and make the operation difficult. It is of greater importance that unless the operation is performed with considerable skill and deliverate care, large amounts of air bubbles occur at the contact surface between the composition and the substrate steel sheet and the surface layer, and may result in such troubles as blisters or cracks in the curing and baking steps.

The epoxy resin composition of the invention is very stable at room temperature for prolonged periods of time, and when heated to the curing temperature, cures at a speed nearly equal to that of metal solder. By making it into a tacky, plastic foam-free one-part sheet-like composition which intimately adheres and conforms to the substrate at room temperature by light hand pressure, it has become possible to overcome the conventional difficulties in operability and finish. It is convenient that this sheet-like composition should be used as a structure obtained by applying a film support to its back surface. Such a structure wound in a roll form is cut to suitable sizes, and can be pressed against an automobile body indirectly from above the film backing. The sheet can then be extended to some degree. Thus, without requiring any great skill, soldering of good efficiency can be performed, and good adhesion and complete freedom from the intrusion of air can be secured.

The epoxy resin composition can also be applied as adhesive seals by somewhat varying the dimension, shape, and other factors of the composition.

The sheet of the epoxy resin composition can be produced by various known methods. For instance, it is produced by heating a normally semi-solid composition to reduce its viscosity to a value suitable for sheet-formation, subjecting it to defoaming, and extruding it into the desired thickness or extending it. Another method of sheet-formation comprises rendering the composition flowable at room temperature by means of a readily volatile solvent, and extruding or coating it, followed by drying. According to still another method, the composition is defoamed, and fabricated in an early stage up to viscosity increase, that is, a stage where the composition is readily flowable, using a special curing agent, such as liquid polysulfide resin, which exerts an effect of curing and viscosity increase at room temperature or in its vicinity, and then viscosity increase and solidification of the composition are completed at room temperature or at a slightly elevated temperature.

It is possible to introduce a strippable backing film during the formation of a sheet of the epoxy resin composition, and the sheet can be continuously extruded onto the backing film, coated, and wound up, In addition, with a composition having great tackiness, this is preferred from the standpoint of subsequent handling and soldering.

The epoxy resin composition of the present invention proves very suitable as a substitute for metal solder because of its many advantages mentioned below.

1. The composition exhibits good storage stability even when exposed for a long time in the form of a sheet.

2. Since the sheet is tacky and plastic, air is not at all introduced to the interface of the substrate by gradually pressing it from the end of a part to be soldered, and intimate adhesion to the substrate can be ensured. After coating, the sheet does not come off because of its tackiness.

3. When the sheet has a backing film, it can be fully and uniformly pressed from the back surface by palms, spatulas, or rollers. Hence, exact adhesion can be expected, and it can be applied without contaminating the hand.

4. The sheet composition can be rapidly cured in a low temperature range not expected according to the conventional knowledge.

5. By the above advantages, soldering can be effected by a method very similar to the partial soldering method using metal solder which is now being practised. In other words, it is not necessary to heat the entire body separately in a heating oven.

6. As incidental effects, the tacky, plastic epoxy resin composition of the invention is suitable for application to plastic panels such as fiber-reinforced plastics which will find greater applications in the future, because of its low heat-curing temperature. Similarly, in solder repairing in the assembly line, it is not altogether necessary to remove thermoplastic resin attachments or interior building materials. This merit cannot be expected with metal solder.

7. The cost and soldering efficiency have been improved, and what is most important, the working environment has been improved.

The application of the epoxy resin composition of the invention to so-called structures such as automobile bodies has been described above. Now, the method of markedly increasing the durability of the epoxy resin composition which is considered essential for application to structures will be described.

Generally, because of their excellent physical and chemical properties, epoxy resin compositions have found a wide range of industrial applications. For uses which require bond strength, the epoxy resin compositions have frequently been used for strong bonding or durable bonding of metal structures because of their superior adhesion to various materials, primarily metals, thermal resistance, and resistance to chemicals.

With increasing examples of use in such a field, many doubts have been cast on the durability of bond strength which was highly evaluated previously. A drastic decrease in bond strength with time has been observed when a bonded structure comprising iron and iron alloy as substrate is used outdoors at high temperatures and high humidities. It has been reported that in some case, the drastic decrease ended in spontaneous breakage.

It has now been found that the main cause for this is that the surface of substrate is degenerated even by slight corrosion.

Epoxy resin compositions including various materials such as adhesion-imparting agents, flexibility-imparting agents, or anti-oxidants have been tested for bonding iron and iron alloys which are strongly susceptible to corrosion. It has been found that these additives prove hardly effective against the drastic decrease in bond strength in the outer atmosphere that occurs with the passage of time; that such drastic decrease is hardly relevant to such factors as the deterioration of the epoxy resin composition itself, or the residual strain on the bonding interface; the decrease in strength with time is especially remarkable under high temperature humidity conditions, and the decrease in strength under high temperature and humidity conditions is due to the formation of an oxide or hydroxide of the surface of the substrate; that the bond strength decrease is remarkable with the oxide having an effect of imparting flexibility due to a reduction in the cross-linking density and has correlation with the moisture content of the composition as a result of moisture absorption; and that there is little influence of thermally degrading factors on these decreases in bond strength.

As a result of closely observing the bonding interface under high humidity conditions and the correlation between the moisture content and bond strength of the adhesive, it has been found that even when no degeneration on the surface of the substrate can be determined with the naked eye, a marked decrease in bond strength occurs within very short periods of time incident to a minute degeneration of the metal surface despite that use of a material, such as an epoxy resin composition, which exhibits very good resistances to water and chemicals after curing. It has also been discovered interestingly that where a finish coating is applied to the surface to be soldered with an epoxy resin composition such as in the soldering of an automobile body prior to the soldering operation, a considerable foaming, that is, blistering, occurs on the finish coated surface under high temperature high humidity conditions at the same time as the bond strength decrease.

Accordingly, the present invention also provides an epoxy resin composition comprising an epoxy resin and a lead-containing inorganic anti-corrosive pigment and/or a chromate-type anti-corrosive pigment.

The epoxy resin composition used for anti-corrosive purposes include various epoxy resin compositions in the form of sheets, pastes, liquids, etc. which are used for bonding and soldering iron and iron alloys, and is not restricted in any way as to its form and use.

This anti-corrosive epoxy resin composition of the invention may contain various additives such as fillers, coloring pigments, thickners, resins, or plasticizers. These additives can be used as desired so long as they do not remarkably impair the bond strength of the composition.

Examples of the lead-containing inorganic anti-corrosive pigments include read lead ($Pb_3O_4$), while lead [$2PbCO_3.Pb(OH2$], lead cyanamide, calcium plumbate, and lead oxide.

Examples of the chromate-type inorganic anti-corrosive pigments are zinc chromate, strontium chromate, barium chromate, and calcium chromate. Zinc chromate and strontium chromate are especially preferred.

The amount of the inorganic anti-corrosive pigment varies according to the desired anti-corrosive effect, the size of the pigment particles, the type and amount of a co-existing filler, the bond strength in humidity of the vehicle components, etc. Generally, however, sufficient effects are obtained by using it in an amount of 10 to 50 % by weight based on the total amount of the vehicle components.

The anti-corrosive epoxy resin composition of the invention can be prepared by the general method described with respect to the basic composition of the invention. The incorporation of the inorganic anti-corrosive pigment can be performed in the same way as powders of ordinary coloring pigments or inorganic fillers. For example, in the case of finely divided particles, mere mixing and stirring can effect the blending of the inorganic anti-corrosive pigment. Where the pigment is in the form of paste, it is kneaded with the epoxy resin composition and then subjected to a pulverizing step by means of three rolls or edge runners.

The anti-corrosive epoxy resin composition may, of course, contain a curing agent or catalyst described hereinabove which is active at high temperatures.

In one preferred embodiment, the anti-corrosive epoxy resin composition comprises an epoxy resin, a normally solid imidazole compound described hereinabove which has a long-chain alkyl group with at least 15 carbon atoms, and the lead-containing and/or chromate-type inorganic anti-corrosive pigment.

The anti-corrosive epoxy resin composition of the invention has a number of advantages among which are:

1. It exhibits a markedly improved bond durability for a material comprising iron and iron alloy under humid conditions or under high temperature high humidity conditions, and therefore finds a wide range of applications in the bonding of structures such as automobiles, or ships, the soldering of panels, concave portions or bonded portions of automobile bodies which especially require durable bond strength, and also in uses which involve outdoor exposure.

2. When it is used as a soldering material, it can almost completely obviate the occurrence of blisters on the finish coated surface. In conjunction with a marked improvement in bonding properties, it leads to a marked feasibility.

3. The anti-corrosive pigments used in the invention are known and available at low cost, and no special consideration should be given to the preparation of the anti-corrosive epoxy resin composition. This is a great economical advantage.

Finally, in an especially preferred embodiment of the invention, the epoxy resin composition contains only the imidazole compound having a long-chain alkyl group with at least 15 carbon atoms as a curing agent. Such a composition has a very suitable performance for use in soldering, and excellent adhesion to a metal surface comprising iron, iron alloy, etc. or a chemically treated surface, and especially permits very good coating finish. This particular composition obviates the occurrence of the surface irregularity or difference such as surface roughening or delustering of the coated surface, and ensures a beautiful coating finish. This good coating finish is due to the use of the imidazole compound alone as a curing agent for the epoxy resin.

As previously stated, the epoxy resin composition containing the specific imidazole compound described may further contain a curing agent or catalyst which is active at high temperatures, and both the imidazole compound and the curing agent or catalyst participate in the curing of the epoxy resin. It has generally been thought that for soldering purposes, the conjoint use of the curing agent or catalyst which is active at high temperatures is desirable for increasing bond strenth. Extensive investigation has showed however that since the curing agent of the epoxy resin is generally high-melting and has poor compatibility with epoxy resins in general and poor dissolving speed, the distribution of its concentration in the composition tends to be non-uniform, and that from a microscopic point of view, a discontinuous phase with varying degrees of curing tends to be formed in the vehicle after curing, and therefore, the non-uniformity of the substrate material induces diffused reflection of light after grinding and coating, which in turn results in the phenomenon of surface irregularity or difference.

The specific imidazole compound used in the invention has a low melting point, and dissolves and diffuses in an epoxy resin rapidly and fully; therefore, it does not cause surface irregularity or difference.

Generally, when a paint is coated on a resin composition, the finish of the coated surface is very inferior to the case of applying the paint directly to a metal substrate, and the so-called surface irregularity or difference such as surface roughening or delustering appears on the finished surface. The difficulty has been completely overcome by the epoxy resin composition of the invention which contains the specific imidazole compound described above as the only curing agent. The specific imidazole compound used in the invention has a low melting point, and dissolves and diffuses in an epoxy resin rapidly and fully; therefore, it does not cause surface irregularity or difference.

The invention will now be described in greater detail by the following Examples and Comparative Examples which are presented for illustrative, rather than limitative, purposes. Unless otherwise specified, all parts and percentages appearing hereinafter are by weight.

EXAMPLE 1

One hundred (100) parts of Epikote 828 (tradename for epoxy resin, Shell Chemical) was pre-mixed with 2 to 10 parts of 2-n-heptadecyl imidazole (20 mesh), and the mixture was passed twice through three rolls to form an epoxy resin composition.

This composition was cured at 100° to 180°C. The time required for curing, and the storage stability of the composition at room temperature (the number of days which elapsed until the composition remained non-flowable) were measured. The results are shown in Table 1.

Table 1

| Amt. of imidazole (PHR) | Gelling time (minutes) at 100°C. | at 120°C. | at 140°C. | at 180°C. | Storage stability (days) |
|---|---|---|---|---|---|
| 2 | 150 | 130 | 110 | 80 | more than 90 |
| 4 | 45 | 20 | 15 | 10 | more than 90 |
| 6 | 30 | 15 | 10 | 5 | more than 90 |
| 8 | 20 | 10 | 6 | 3 | 50 |
| 10 | 17 | 6 | 5 | 3 | 35 |

COMPARATIVE EXAMPLE 1

Example 1 was repeated except that 2-methyl imidazole (2MI for short; solid m.p. 137°C.), 2-ethyl-4-methyl imidazole (2E4MI for short; liquid), 2-phenyl imidazole (2PI for short; solid m.p. 148°C.), and 2-n-undecylimidazole (C11I for short; solid m.p. 75°C.) were respectively used instead of the 2-n-heptadecyl imidazole used in Example 1. (These imidazole compounds are compatible with the epoxy resin at room temperature.) The curing conditions and storage stability are shown in TAble 2 below.

TABLE 2

| Imidazole | Amount of imidazole (PHR) | Gelling time (minutes) at 120°C. | at 140°C. | Storage stability (days) |
|---|---|---|---|---|
| 2E4MI | 2 | 20 | 15 | 4 |
|  | 4 | 5 | 5 | 3 |
| 2PI | 2 | 20 | 10 | 5 |
|  | 4 | 10 | 5 | 4 |
| 2MI | 1 | 10 | 5 | 4 |
|  | 2 | 5 | 4 | 2 |
| C11I | 4 | 15 | 8 | 20 |
|  | 6 | 10 | 5 | 12 |

It is seen from the results shown in Tables 1 and 2 that the imidazole compounds having compatibility with epoxy resins at room temperature exhibit only poor storage stability (short pot life) although they are liquid or solid, and cannot be used for one-part compositions. Furthermore, at a curing temperature up to about 120°C., no outstanding difference is seen in curing time between the composition containing the imidazole compound insoluble at room temperature and the compositions containing the imidazole compounds shown in Comparative Example 1. Almost the same curing times can be attained by increasing the amount of the imidazole compound to be added.

EXAMPLE 2

Example 1 was repeated except that 2-n-heneicosyl imidazole (20 mesh) was used as the imidazole compound. The curing times of the resulting composition at 120°C. and 140°C. and the storage stability thereof at room temperature were measured, and the results shown in Table 3.

TABLE 3

| Amount of imidazole (PHR) | Gelling time (minutes) at 120°C. | at 140°C | Storage stability (days) |
|---|---|---|---|
| 4 | 90 | 60 | more than 90 |
| 6 | 35 | 15 | more than 90 |
| 8 | 20 | 10 | more than 90 |

EXAMPLE 3

One hundred parts (100) of Epikote 828 was mixed with 5 parts of dicyandiamide (200 mesh) and 0 to 10 parts of 2-n-heptadecyl imidazole (20 mesh), and an epoxy resin composition was prepared in the same way as set forth in Example 1. The resulting composition was heated at 100° to 180°C., and the curing time and storage stability at room temperature wee measured. The results are shown in Table 4.

Compositions were also prepared in the same way as above using 20 parts of powdery benzoguanamine, 30 parts of powdery 4,4'-diaminodiphenyl sulfone, and 15 parts of powdery isophthalic acid dihydrazide instead of the dicyandiamide repectively. The same tests were carried out, and the results are shown in Table 4 below.

jointed steel sheet was pulled at a cross head speed of 1.25 mm/min., and the tensile shear strength was measured. It was found that the bond strength measured by this method is 150 Kg/cm².

EXAMPLE 5

| | |
|---|---|
| Epikote 828 | 75 parts |
| Epikote 871 (diglycidyl ester of unsaturated fatty acid dimer) | 15 |
| Butyl glycidyl ether (diluent) | 10 |
| 2-n-Heptadecyl imidazole (100 mesh) | 8 |

These ingredients were mixed by stirring in a stirring tank to form a flowable, low-viscosity composition for casting. When cured at 120°C. for 20 minutes, this

TABLE 4

| Curing agent | Amount of imidazole (PHR) | Gelling time (minutes) | | | | Storage stability (days) |
|---|---|---|---|---|---|---|
| | | at 100°C | at 120°C | at 140°C | at 180°C | |
| Dicyandiamide | 0 | more than 180 | more than 180 | more than 180 | 160 | more than 90 |
| | 1 | 150 | — | 30 | 20 | more than 90 |
| | 2.5 | 80 | 30 | 10 | 5 | more than 90 |
| | 10 | 25 | 10 | 5 | 4 | 40 |
| Benzoguanamine | 0 | more than 180 | more than 180 | more than 180 | 60 | more than 90 |
| | 1 | — | — | — | — | more than 90 |
| | 2.5 | 60 | 30 | 20 | 10 | 90 |
| | 10 | 15 | 10 | 5 | 5 | 30 |
| Isophthalic acid dihydrazide | 0 | 180 | 120 | 40 | 10 | more than 90 |
| | 1 | 120 | — | 30 | 10 | more than 90 |
| | 2.5 | 40 | 15 | 7 | 5 | 40 |
| | 10 | 15 | 10 | 5 | 3 | 30 |
| Diaminodiphenyl sulfone | 0 | more than 180 | 150 | 130 | 40 | more than 90 |
| | 1 | more than 180 | — | 100 | 25 | more than 90 |
| | 2.5 | 40 | 20 | 15 | 10 | 35 |
| | 10 | 15 | 5 | 4 | 4 | 30 |

It is demonstrated by the results shown in Tables 1 and 4 that by adding a small amount of 2-n-heptadecyl imidazole, the curing temperature of the high temperature active curing agents shown in Table 4 can be drastically decreased, although this causes some reduction in storage stability as compared with the case of using the imidazole compound alone as the curing agent. A decrease of more than 80°C. in curing temperature is possible especially with inert curing agents such as dicyandiamide or benzoguanamine.

EXAMPLE 4

One hundred (100) parts of Epikote 1001, 4 parts of dicyandiamide, and 3 parts of 2-n-pentadecyl imidazole, all of which had been pulverized to 300 mesh, were thoroughly mixed in a V blender to form an epoxy resin composition. The resulting powdery composition was uniformly sprayed on a cold-rolled steel sheet having a thickness of 0.8 mm. and heated for 30 minutes at 120°C. There is obtained a substantially colorless, transparent, beautiful coated article. Hence, this composition can be used for powdery spraying. The powder has good flowability, and can find applications in compression or transfer molding.

The powdery composition was placed on a cold-rolled steel sheet having a size of 1.6 × 25 × 100 mm, and a steel sheet of the same size was superposed on it with an overlapping length of 12.5 mm. The composition was cured at 120°C. for 20 minutes. Then, the composition cured to a transparent cured product. Before curing, the composition was semi-transparent. The cured product had a Shore hardness D of 95, and a volume resistivity of $4.9 \times 10^{15}$ ohms-cm at room temperature and atmospheric pressure. The storage stability of this composition was more than 2 months at room temperature when measured by the method hereinabove described.

EXAMPLE 6

| | | |
|---|---|---|
| Epikote 828 | 100 | parts |
| Polypropylene glycol (mol. wt. 700) | 20 | |
| Benzoguanamine | 10 | |
| 2-n-Heptadecyl imidazole (20 mesh) | 8 | |
| Bentone 34 (organic bentonite, thixotropic agent) | 15 | |
| Soarlex DH (ethylene/vinyl acetate copolymer) | 7 | |
| Heavy calcium carbonate | 30 | |
| Cadmium yellow (coloring agent) | 2.5 | |
| Phthalocyanine blue (coloring agent) | 0.2 | |
| Toluene | 40 | |

These ingredients excluding 20 parts of toluene were pre-mixed by means of a Z-type kneader, and passed twice through three rolls to perform kneading sufficiently. The remaining toluene (20 parts) was added to the kneaded mixture in the kneader, and the mixture was agitated under reduced pressure to obtain a dipcoating composition. This resulting composition was a green-blue liquid having a viscosity of about 5,000 CP which was non-sagging.

When, for example, a small-sized Mylar film condenser was dipped in the composition at room temperature, and then heated at 120°C., it cured completely in about 20 minutes to form a uniform film having a thickness of 0.5 to 1 mm. The cured product had a volume resistivity of $1.5 \times 10^{15}$ ohms-cm in a normal condition. The stability in storage of this composition at room temperature was more than 3 months.

EXAMPLE 7

| | |
|---|---|
| Epikote 828 | 50 parts |
| Dow Epoxy DER-732 (polyalkylene glycol diglycidyl ether) | 30 |
| Epikote 152 (novolak phenol polyglycidyl ether) | 20 |
| Dicyandiamide | 5 |
| 2-n-Heptadecyl imidazole | 6 |
| Bentone 34 | 15 |
| Aluminum powder (325 mesh) | 60 |

These ingredients were pre-mixed with a Z-type kneader, passed once through three rolls, and again mixed in the Z-type kneader at reduced pressure while defoaming. The resulting composition was a viscous non-sagging paste having a viscosity of 500,000 useful as a metal adhesive, and a soldering material for build-up welding of metal sheet. No corrosion on the metal was observed The curing of this composition can be performed at 100°C. for 60 minutes, at 160°C. for 10 minutes, or at 200°C. for 5 minutes, and there was little effect of over-curing (temperature and time).

The storage stability of this composition at room temperature was more than 3 months.

The resulting composition was spread on a steel sheet, and various tests shown in Table 5 were conducted. The results are shown in Table 5.

TABLE 5

| Test items | Test methods | Test results | Curing conditions |
|---|---|---|---|
| 1. Tensile shear test (Kg/cm²) | ASTM D1002-64 | 215 | 100°C., 90 min. |
| | | 220 | 120°C., 30 min. |
| | | 240 | 140°C., 30 min. |
| | | 235 | 160°C., 48 hrs. |
| 2. Tensile test | ASTM D897-49 | 370 | 140°C., 40 min. |
| Cleavage test | ASTM D1062-51 | 590 | 140°C., 40 min. |

It is seen from the results obtained in the foregoing Examples that the epoxy resin compositions of the present invention can be easily produced and handled, and possess excellent low temperature heat-curability and storage stability. Because of such superior properties, the composition can find applications in a wide range such as coating, bonding, filling, and casting.

EXAMPLE 8 AND COMPARATIVE EXAMPLE 2

Portions (1) to (7) shown in Table 6 were homogeneously kneaded by means of a vertical-type mixer or Z-type kneader, and then passed through three rolls. The mixture was returned to the mixer or kneader, and portions (8) and (9) were added. The mixture was stirred for about one hour at a reduced pressure of 5–10 mmHg to form a one-part paste composition having superior durable adhesion.

The composition of Comparative Example 2 was prepared in the same manner except that the anti-corrosive pigment was not used. The amount of portion (9) of the composition of Comparative Example 2 was changed in order to render the viscosity of the composition and the volume percentage of the filler substantially the same as those of the composition of Example 8.

Using a steel sheet (JIS G-3141), a test piece for measuring the tensile shear strength (ASTM D1002-64) was prepared. The curing was performed at 140°C. for 40 minutes. The humidity resistance test was performed for 21 days in an atmosphere held at 50°C. and 100% RH. The results are shown in Table 6.

TABLE 6

| | Example 8 | Comp. Ex. 2 | Portion |
|---|---|---|---|
| Epikote 828 | 40 parts | 40 parts | (1) |
| Epikote 834 | 10 | 10 | (2) |
| Epikote 871 | 30 | 30 | (3) |
| Dow Chemical urethane-modified epoxy resin XD-3599 | 20 | 20 | (4) |
| Dicyandiamide | 8 | 8 | (5) |
| 2MI-AZINE * | 4 | 4 | (6) |
| Bentone 34 | 12 | 12 | (7) |
| Red lead | 40 | — | (8) |
| Atomized aluminum powder (200 mesh) | 60 | 80 | (9) |
| Tensile shear strength before humidity test (Kg/cm²) | 238 | 247 | |
| Tensile shear strength after humidity test (Kg/cm²) | 221 | 128 | |
| Retention (%) of sheer strength after the humidity test | 92.8 | 51.8 | |
| Tensile shear strength after heating at 50°C. for 21 days | 233 | 239 | |

It is seen from the results obtained that the composition of Example 8 hardly decreases in bond strength even after the humidity resistance tests as compared with the composition of Comparative Example 2, exhibiting a marked effect of the anti-corrosive pigment.

* 2MI-AZINE is 1-(2,4-diamino-s-triazine-6-ethylene)-2-methyl imidazole having the following structure:

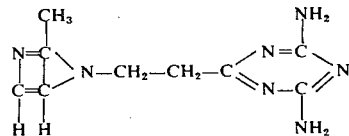

EXAMPLE 9 AND COMPARATIVE EXAMPLE 3

Portions (1) and (2) indicated in Table 7 were uniformly mixed by means of a vertical-type mixer or Z- type kneader, and upon addition of portion (3), the mixture was stirred for about one hour at 5–10 mm Hg to form an epoxy resin composition containing the anticorrosive inorganic pigment.

The composition of Comparative Example 3 was prepared except that portion (2) was not added.

After mixing the compositions of Example 9 and Comparative Example 3, the same tests as set forth in Example 8 were conducted. The results are shown in Table 7.

TABLE 7

|  | Example 9 | Com.Ex. 3 | Portion |
|---|---|---|---|
| Epikote 828 | 100 parts | 100 parts | (1) |
| Lead cyanamide | 20 | — | (2) |
| Versamido 140 (curing agent) | 100 | 100 | (3) |
| Tensile shear strength before the humidity resistance test (kg/cm$^2$) | 110 | 101 | |
| Tensile shear strength after the humidity resistance test (Kg/cm$^2$) | 93.7 | 35.2 | |
| Retention (%) of sheer strength after the humidity resistance test | 85.2 | 34.9 | |

It is seen from the results shown in Table 7 that the composition of Example 9 exhibited far superior bond strength retension to the composition of Comparative Example 3. The composition is therefore suitable for used which require durability of adhesion.

EXAMPLE 10 AND COMPARATIVE EXAMPLE 4

Portions (4) and (5) were pre-mixed with portion (1), and passed through three rolls to obtain a uniformly dispersed paste. Portions (2) and (3) were stirred using a heating-type vertical mixer at 70° to 80°C. After the solid resin was completely dissolved, portions (6) to (8) were added, and the mixture was stirred at 5–10 mmHg. The dispersed paste obtained above was added to the resulting mixture whose temperature had been lowered at 50°–60°C. The mixture was stirred for a while at 5–10 mmHg, and poured into an extruder with a care taken not to introduce foams. It was extruded in a sheet form on releasing paper from a die, and wound up while cooling, thereby to obtain a sheet-like composition.

The composition of Comparative Example 4 indicated in Table 8 was prepared in the same way as above except that the anti-corrosive pigment was not added.

The sheet-like composition obtained was suitable for soldering the jointed parts of panels of an automobile body. The sheet in a thickness of about 4 mm was adhered to the automobile body, and heated to 2 to 3 minutes with hot air (about 300°C.) to cure it. The soldered part was ground, and finished.

The compositions of Example 10 and Comparative Example 4 were tested as to the properties shown in Example 8 in the same way as set forth there. The curing was performed at 140°C. for 40 minutes. The results are given in Table 8.

TABLE 8

|  | Example 10 | Comp. Ex. 4 | Portion |
|---|---|---|---|
| Epikote 828 | 15 parts | 15 parts | (1) |
| Epikote 1001 | 50 | 50 | (2) |
| Epikote 871 | 35 | 35 | (3) |
| Dicyandiamide | 5 | 5 | (4) |
| 2-n-Heptadecyl imidazole | 10 | 10 | (5) |
| Bentone 34 | 10 | 10 | (6) |
| Talc | 50 | 60 | (7) |
| Zinc chromate | 30 | — | (8) |
| Tensile shear strength before the humidity resistance test (Kg/cm$^2$) | 135 | 147 | |
| Tensile shear strength after the humidity resistance test (Kg/cm$^2$) | 130 | 63 | |
| Retention (%) of sheer strength after the humidity resistance test | 96.3 | 42.9 | |

It is seen from the results shown in Table 8 that the composition of Example 10 exhibited far superior bond strength retension to the composition of Comparative Example 4, and that the chromate-type inorganic anticorrosive pigment used proved equally effective.

Example 11

| Epikote 828 | 60 parts |
|---|---|
| Epikote 871 | 30 |
| Dow Epoxy XD-3599 | 20 |
| 2-n-Heneicosyl imidazole | 18 |
| Strontium chromate | 10 |
| Red lead | 20 |
| Talc | 30 |
| Bentone 34 | 15 |

These ingredients were pre-mixed by means of a Z-type kneader, and passed through three rolls twice. The mixture was then returned to the Z-kneader, and kneaded while defoaming under reduced pressure. The resulting composition was a non-sugging, viscous paste-like epoxy resin composition useful for soldering automobile outer panels.

Using a pressure pump, the composition was discharged into the desired place for soldering. A Mylar film having a thickness of 0.05 mm was placed along the discharged composition, and a heater-containing heated plate held at 200°C. was pressed against the extruded composition through the Mylar film to effect the curing of the composition. The maximum thickness of the composition at this time was 4 mm, and the time required for curing was 7 minutes.

The coated article was ground, polished, and painted in a customary manner. The painted surface was very beautiful, and there was no difference in surface appearance between the soldered part and the steel sheet.

When this painted article was allowed to stand for 72 hours in a tank conditioned to 50°C. and 100%RH, the painted surface exhibited the same conditions as before standing, and there was no appreciable occurrence of blister.

The properties of the epoxy resin composition after curing were measured as follows:

1. Curing properties:

The composition was cured in a hot air oven. The temperature and time needed until the composition cured to a product that could be ground and polished were measured.

| | | |
|---|---|---|
| 120°C. | 18 | minutes |
| 150°C. | 6 | minutes |
| 200°C. | 2.5 | minutes |

2. Tensile shear strength (ASTM D1002-62):

The composition was heat-cured at 150°C. for 15 minutes on a cold rolled steel sheet to prepare a test piece. It was found that the test piece had a tensile shear strength of 175 Kg/cm².

3. Tensile shear strength after the humidity resistance test (ASTM D 1002-64):

A test piece prepared in the same way as set forth in 2 above was allowed to stand for 21 days in a tank conditioned to 50°C. 100%RH. It was found that the test piece had a tensile shear strength, after the humidity resistance test, of 162 Kg/cm², showing a bond strength retension of 92.6%.

EXAMPLE 12

| | | |
|---|---|---|
| Epikote 1001 | 50 parts | (1) |
| Epikote 828 | 15 | (2) |
| Epikote 871 | 35 | (3) |
| Bentone 34 | 10 | (4) |
| Titanium white | 5 | (5) |
| Carbon black powder | 0.2 | (6) |
| Talc | 60 | (7) |
| Dicyandiamide powder | 5 | (8) |
| 2-n-Heptadecyl imidazole powder | 10 | (9) |

Portions (8) and (9) were premixed with portion (2) and then kneaded with three rolls to obtain a uniformly dispersed paste. Portions (1) and (3) were stirred at 70°–80°C. using a heating-type kneader, such as a Z-type kneader or a vertical-type mixer with a jacket. After the solid resin had been completely dissolved, portions (4) to (7) were added. The mixture was thoroughly stirred in a vacuum of 5–10 mmHg. The dispersed paste was added to the mixture whose temperature had been lowered to 50°–60°C. The mixture was stirred for several minutes under vacuum. The mixture was then poured into an extruder with a care taken not to introduce foams. The mixture was extruded through a die having a thickness of 4 mm and a width of 100mm at about 40°C. onto double faced releasing paper, and wound up while cooling, thereby to form a sheet-like composition. This composition had some pressure-sensitive tackiness and excellent plasticity at room temperature, and could be easily stripped off from the releasing paper.

The sheet was cut to a suitable length (usually 50 to 100 mm) in the process of assembling automobile parts, and closely adhered to the parts to be soldered of an automobile body which had been cleansed with a solvent, bonding it with the use of a finger tip. The adhered part was fully rubbed with a roller, and then the releasing film was removed. Where it was desired to rendered the soldered composition thin, a thick Teflon film, for example, was placed on it, and it was slowly and strongly extended by a roller. Then, hot air held at about 300°C. was applied uniformly to the center of the soldered part and the substrate steel sheet in the neighborhood of the soldered part in an alternate manner. Heating was stopped in about 2 minutes when the surface was substantial by solidified, and then another part was treated in the same way. After cooling, the soldered part was ground with a disc sander, and if desired, subjected to wet sanding. Then, an ordinary coating step was performed.

The outer appearance of the soldered parts of the finished automobile exhibited a beautiful coating finish, and no difference was observed between them and the steel sheets. Furthermore, in a bad road running test using a test car, no trouble such as cleavage occurred at the soldered parts even after running 5,000 Km.

The basic properties of this composition were measured as follows:

1. Curing properties (in hot air oven):

| | |
|---|---|
| 120°C. | 15 minutes |
| 140 | 8 |
| 160 | 5 |
| 180 | 3 |

2. Adhesion test (tensile shear strength ASTM D1002-64):

Cured at 120°C. for 30 minutes 158 Kg/cm²

3. Dumbell properties of the cured product:-

| | |
|---|---|
| Cured at 120°C. for 30 minutes | |
| Elongation | 3.5 % |
| Tensile strength | 275 Kg/cm² |

EXAMPLE 13

| | | |
|---|---|---|
| Epikote 834 | 65 parts | (1) |
| Epikote 871 | 10 | (2) |
| Thiokol LP-3 (liquid polysulfide polymer) | 25 | (3) |
| Bentone 34 | 6 | (4) |
| Titanium white | 5 | (5) |
| Carbon black | 0.5 | (6) |
| Mica powder (250 mesh) | 20 | (7) |
| Clay | 60 | (8) |
| Benzoguanamine (powder) | 15 | (9) |
| 2-n-Heneicosyl imidazole (powder) | 15 | (10) |

Portion (3) was premixed with portions (10) and (9), and passed once or twice through three rolls to form a uniformly dispersed paste. Portions (1) and (2) were mixed uniformly in a kneader (such as a Z-type kneader, preferably a vertical-type kneader), and then portions (4) to (8) and the dispersed paste were added. The mixture was thoroughly stirred in a vacuum of 5–10 mmHg. The resulting mixture was poured into an extruder with a care taken not to introduce foams, and extruded onto a double faced releasing film from a die having a thickness of 3 mm and a width of 100 mm. The extruded product was allowed to stand for one to several days at 30°C. The extruded sheet became a semi-solid sheet having moderate tackiness, and could be easily removed from the releasing film. It was used for soldering purposes in the same way as set forth in Example 12.

The basic properties of the resulting composition were measured as follows:

1. Curing properties:

| | |
|---|---|
| 120°C. | 25 minutes |
| 140 | 13 |
| 160 | 8 |

2. Adhesion test (tensile shear bond strength ASTM D1002-64):
Cured at 140°C. for 30 minutes; 165 Kg/cm$^2$ 3. Dumbell properties of the cured product:

| | |
|---|---|
| Cured at 140°C. for 30 minutes | |
| Tensile strength: | 175 Kg/cm$^2$ |
| Elongation: | 12.5% |

EXAMPLE 14

| | | |
|---|---|---|
| Epikote 1004 | 20 parts | (1) |
| Epikote 1001 | 30 | (2) |
| Epikote 871 | 50 | (3) |
| Bentone 34 | 15 | (4) |
| Red iron oxide | 50 | (5) |
| Clay | 30 | (6) |
| Diaminodiphenyl sulfone | 20 | (7) |
| 2-n-Heptadecyl imidazole | 10 | (8) |
| Toluene | 30 | (9) |

A part of portion (3) was premixed with portions (7) and (8), and passed once or twice through three rolls to form a uniformly dispersed paste. Portions (1) to (3) were stirred at 80°–100°C. by means of a heating-type kneader (for example, Z-type kneader, preferably vertical-type mixer). After the solid resin had been completely dissolved, the temperature of the mixture was lowered to 50° to 60°C. Portion (9) was then added, and the mixture was cooled to room temperature with stirring. After cooling, portions (4) to (6) and the dispersed paste were added, and the mixture was thoroughly stirred at a reduced pressure of 20 to 50 mmHg. The resultant composition was coated on a releasing film in a thickness of 2 mm and a width of about 100 mm with a care taken not to introduce foams, and allowed to stand in an atmosphere of hot air at 30° to 40°C. The solvent was evaporated, and a semisolid sheet having some tackiness was obtained, which was used for soldering purposes in the same way as set forth in Example 12.

The basic properties of the composition were measured as follows:
1. Curing properties:

| | |
|---|---|
| 120°C. | 16 minutes |
| 140°C. | 8 minutes |
| 160°C. | 4 minutes |

2. Adhesion test (tensile shear bond strength ASTM D1002-64):
Cured at 140°C. for 30 minutes; 175 Kg/cm$^2$ 3. Dumbell properties of the cured product:

| | |
|---|---|
| Cured at 140°C. for 30 minutes | |
| Tensile strength: | 215 Kg/cm$^2$ |
| Elongation: | 5.2% |

EXAMPLE 15

| | | |
|---|---|---|
| Epikote 1001 | 50 parts | (1) |
| Epikote 838 | 15 | (2) |
| Epikote 871 | 35 | (3) |
| Bentone 34 | 10 | (4) |
| Titanium white | 5 | (5) |
| Carbon black powder | 0.2 | (6) |
| Talc | 60 | (7) |
| Dicyandiamide powder | 5 | (8) |
| 2-n-Heptadecylimidazole powder | 10 | (9) |

Portions (8) and (9) were pre-mixed with portion (2), and kneaded with three rolls, to form a uniformly disperse paste. Portions (1) and (3) were stirred at 70°–80°C. using a heating-type kneader such as a Z-type kneader, preferably vertical-type mixer. After the solid resin had been fully dissolved, portions (4) to (7) were added, and the mixture was fully stirred at a reduced pressure of 5 to 10 mmHg. The temperature of the mixture was lowered to 50° to 60°C., and the dispersed paste was added. The mixture was stirred for several minutes under vacuum, and then poured into an extruder with a care taken not to introduce foams, followed by extruding onto double-faced releasing paper at about 40°C. through a die having a thickness of 4 mm and a width of 100 mm. It was then wound up while cooling, to form a sheet-like composition which had some tackiness and superior plasticity at room temperature and could be easily stripped off from the releasing paper.

The resulting sheet-like composition was used for soldering an automobile body in the same way as set forth in Example 12, and similar good results were obtained.

The basic properties of the resultant composition were measured as follows:
1. Curing properties (in hot air oven)

| | |
|---|---|
| 120°C. | 15 minutes |
| 140 | 8 |
| 160 | 5 |
| 180 | 3 |

2. Adhesion test (tensile shear strength ASTM D1002-64)
Cured at 120°C. for 30 minutes; 158 Kg/cm$^2$ 3. Dumbbell properties of the cured product:

| | |
|---|---|
| Cured at 120°C. for 30 minutes | |
| Tensile strength: | 275 Kg/cm$^2$ |
| Elongation: | 3.5% |

EXAMPLE 16

| | | |
|---|---|---|
| Epikote 834 | 65 parts | (1) |
| Epikote 871 | 10 | (2) |
| Thiokol LP-3 | 25 | (3) |
| Bentone 34 | 6 | (4) |
| Titanium white | 5 | (5) |
| Carbon black | 0.5 | (6) |
| Mica powder (250 mesh) | 20 | (7) |
| Clay | 60 | (8) |
| Benzoguanamine (powder) | 15 | (9) |
| 2-n-Heneicosyl imidazole (powder) | 15 | (10) |

Portion (3) was pre-mixed with portions (9) and (10), and passed once or twice with three rolls to form a uniformly dispersed paste. Portions (1) and (2) were mixed uniformly by means of a kneader (for example, Z-type kneader, preferably a vertical-type mixer), and then portions (4) to (8) and the dispersed paste were added. The mixture was thoroughly stirred under a vacuum of 5 to 10 mmHg, and poured into an extruder with a care taken not to introduce foams. The mixture was extruded on a double-faced releasing film from a die having a thickness of 3 mm and a width of 100 mm, and allowed to stand for one to several days at 30°C. The extruded sheet then became a semi-solid sheet having moderate tackiness, and could be readily removed from the releasing film. The sheet obtained was used for soldering purposes in the same way as described in Example 12.

The basic properties of the composition were measured as follows:

1. Curing properties:

| 120°C. | 25 minutes |
|---|---|
| 140 | 13 |
| 160 | 8 |

2. Adhesion test (tensile shear bond strength ASTM D1002-64):
Cured at 140°C. for 30 minutes; 165 Kg/cm$^2$ 3. Dumbbell properties of the cured product:

| Cured at 140°C. for 30 minutes | |
|---|---|
| Tensile strength: | 175 Kg/cm$^2$ |
| Elongation: | 12.5% |

EXAMPLE 17

| | | |
|---|---|---|
| Epikote 1004 | 20 parts | (1) |
| Epikote 1001 | 50 | (2) |
| Epikote 871 | 50 | (3) |
| Bentone 34 | 15 | (4) |
| Red iron oxide | 50 | (5) |
| Clay | 30 | (6) |
| Diaminodiphenyl sulfone | 20 | (7) |
| 2-n-Heptadecyl imidazole | 10 | (8) |
| Toluene | 30 | (10) |

A part of portion (3) was pre-mixed with portions (7) and (8), and the mixture was passed once or twice through three rolls to form a uniformly dispersed paste. The portions (1) to (3) were stirred for 80° to 100°C. by means of a heating-type kneader (for example, Z-type kneader, preferably a vertical type mixer). After completely dissolving the solid resin, the temperature of the mixture was lowered to 50° to 60°C., and on addition of portion (9), the mixture was cooled with stirring to room temperature. After cooling, portions (4) to (6) and the dispersed paste were added, and the mixture was thoroughly stirred at a reduced pressure of 20 to 50 mmHg. The resulting composition was coated on a releasing film in a thickness of 2 mm and a width of about 100 mm with a care taken not to introduce foams, and allowed to stand under hot air at 30° to 40°C. to evaporate the solvent. The resulting semi-solid sheet had some tackiness, and was suitable for use in soldering same as in Example 12.

The basic properties of the composition were measured as follows:

1. Curing properties:

| 120°C. | 16 minutes |
|---|---|
| 140 | 8 |
| 160 | 4 |

2. Adhesion test (tensile shear strength ASTM D1002-64):
Cured at 140°C. for 30 minutes; 175 Kg/cm$^2$ 3. Dumbbell properties of the cured product:

| Cured at 140°C. for 30 minutes | |
|---|---|
| Tensile strength: | 215 Kg/cm$^2$ |
| Elongation: | 5.2% |

EXAMPLE 18

| | (I) | (II) | (III) |
|---|---|---|---|
| Epikote 828 | 60 parts | 60 parts | 60 parts |
| Epikote 871 | 40 | 40 | 40 |
| Bentone 38 | 15 | 15 | 15 |
| Titanium white (rutile) | 10 | 10 | 10 |
| Carbon black | 0.5 | 0.5 | 0.5 |
| Talc | 50 | 50 | 50 |
| 2-n-Pentadecyl imidazole | 8 | — | — |
| 2-n-Heptadecyl imidazole | — | 10 | — |
| 2-n-Heneicosyl imidazole | — | — | 15 |

These ingredients were pre-mixed with each other by means of a Z-type kneader, and passed twice through three rolls. The mixture was then returned to a Z-type kneader, and defoamed and mixed at a reduced pressure of 5 to 10 mmHg, to obtain a paste-like composition.

The resulting epoxy resin composition was coated on a degreased steel sheet in a thickness of about 3 mm, and cured at 160°C. for 15 minutes in a hot air oven, followed by cooling. The coated soldered parts were ground and polished with emery paper No. 80 and then with emery paper No. 240 until there was no difference in height between the steel sheet surface and the end portions of the soldered parts.

The steel sheet was then subjected to a series of the following treatments, and then coated.

| Treating steps | Treating liquor | Treating conditions |
|---|---|---|
| (1) Degreasing | ACP Ridoline No. 24 | Immersed for 3 minutes at 80°C., and washed with water |
| (2) Acid treatment | ACP Deoxidine No. 171 | Immersed for 3 minutes at 80°C., and washed with water |
| (3) Chemical treatment | ACP Granodine No. 45A | Immersed for 3 minutes at 75°C., and washed with water |
| (4) Post-treatment | ACP Deoxilite No. 11 | Immersed for 1 minute at 70°C., water removed, and dried |
| (5) Electrodeposition coating | Electron 1800 | Treated for 3 minutes at 280 V, washed with water, and baked for 30 minutes at 170°C. |

After the baking of the electrodeposition coating, a melaminealkyd type lacquer for second coat was sprayed against the steel sheet, and baked for 30 minutes at 150°C. The steel sheet was then wet sanded with emery paper No. 320, and then with emery paper No. 500. Water was removed, and the steel sheet was dried. Then, a melamine-alkyd top coat for automobile was sprayed against the steel sheet, and baked for 30 mintes at 150°C. The coating finish was observed, and the results are shown in the following.

| Composition | (I) | (II) | (III) |
|---|---|---|---|
| Coating finish | Very good | Very good | Very good |

For comparative purposes, other curing agents than imidazole were used, and the coating finish was examined. The amounts of other ingredients were the same as runs (I), (II), and (III) mentioned above. The results are shown below.

| Curing agents | Amount (part) | Curing conditions | Coating finish |
|---|---|---|---|
| Dicyandiamide | 5 | 200°C., 15 min. | Considerably fine blisters occurred over the entire surfaces of the soldered parts; irregularity or difference in surface |
| Acetoguanamine | 10 | 200°C., 60 min. | " |
| Isophthalic acid dihydrazide | 15 | 200°C., 20 min. | Somewhat large blisters occurred over the entire surfaces of the soldered parts; irregularity or difference in surface |

It is seen from the above that the soldering epoxy resin composition containing the imidazole compound alone as a curing agent exhibited very superior coating finish, and fully satisfied the stringent outer finish required of an automobile body.

EXAMPLE 19

| Epikote 828 | 60 parts |
|---|---|
| Epikote 871 | 40 |
| 2-n-Heptadecyl imidazole | 15 |
| Bentone 38 | 15 |
| Titanium white (anatase) | 10 |
| Carbon black | 0.5 |
| Talc | 30 |
| Red lead | 20 |

These ingredients were pre-mixed with each other by means of a Z-type kneader, and passed twice through three rolls, and the mixture was returned to the Z-type kneader. Then, 50 parts of electrolytic copper powder (500 mesh) was added, and mixed with the mixture while defoaming under reduced pressure. The resulting composition was a non-sagging, viscous paste-like epoxy resin composition. Using a pressure pump, the composition was spread on the desired part with a care taken not to introduce foams, and extended by means of a spatula. A hot plate containing a heater therein and lined with a Teflon film conforming to the shape of a part to be processed was heated to a surface temperature of 200°C., and then bonded to the soldered composition, followed by curing. The maximum thickness was 4 mm, and the time required for curing was about 5 minutes.

The composition was then ground, and finished with application of a coating in accordance with a customary manner. The finish of the coated film was very beautiful, and no difference in surface was observed between the steel sheet surface and the soldered or padded parts.

In the preparation of the composition of this Example, it is also possible to produce first a paste composition of 2-n-heptadecyl imidazole with a suitable amount of Epikote 871 by kneading with three rolls and defoaming the mixture under reduced pressure, and then mix it with the other ingredients prior to use.

The properties of this composition after curing are shown below.

1. Curing properties:

The composition was heat-cured in a hot air oven. The curing temperature and time required until the composition cured to a product that could be ground were measured. The results are as follows:

| 120°C. | 15 minutes |
|---|---|
| 150°C. | 5 minutes |
| 200°C. | 2 minutes |

2. Tensile shear strength (ASTM D-1002-64):

The composition was cured at 150°C. for 15 minutes on a cold rolled steel sheet to form a test piece. The tensile shear strength of the test piece obtained was 165 Kg/cm$^2$.

EXAMPLE 20

| Epikote 828 | 15 parts | (1) |
|---|---|---|
| Epikote 1001 | 50 | (2) |
| Epikote 871 | 35 | (3) |
| 2-n-Heneicosyl imidazole | 10 | (4) |
| Bentone 34 | 10 | (5) |
| Talc | 50 | (6) |
| Titanium white (rutile) | 5 | (7) |
| Carbon black | 0.3 | (8) |
| Lead oxide | 25 | (9) |

Portions (1) and (4) were premixed with each other, and then kneaded by means of three rolls to form a uniformly dispersed paste. Portions (2) and (3) were stirred at 70° to 80°C. using a heating-type kneader, such as a Z-type kneader. After the solid resin was completely dissolved, portions (5) to and the dispersed paste (9) were added, and the mixture was thoroughly stirred at a reduced pressure of 5 to 10 mmHg. The temperature of the mixture was then lowered to 50° to 60°C., and then the dispersed paste was added, followed by stirring the mixture in vacuum for several minutes. The resulting composition was poured into an extruder with a care taken not to introduce foams, and extruded onto a double-faced releasing paper from a die having a thickness of 4 mm and a width of 100 mm at a temperature of about 40°C., followed by winding up while cooling, thereby to obtain a sheet-like composition. This composition had some tackiness and excellent plasticity, and could be readily stripped off from the releasing paper.

The resulting sheet was cut to the desired length in the automobile assembling process, and adhered closely to the parts to be soldered of an automobile body which had been cleansed with a solvent, using a finger tip. It was then fully bonded by means of a roller, and then the releasing paper was removed. Two 375 watt infrared electric balbs were used, and heating was performed from a distance about 20 cm from the soldered parts, thereby to cure the applied sheet-like composition. The temperature of the surfaces of the soldered parts determined by a heat-sensitive paint was about 200°C. at a maximum, and the time required for curing was about 4 minutes.

In the same manner as set forth in Example 19, the automobile body was ground, and finished by application of a lacquer. The finish of the resulting coated film was beautiful as in Example 19.

The properties of this composition after curing were measured as follows:

1. Curing properties:

The composition was heat-cured in a hot air oven. The curing temperature and time required until the composition cured to a product that could be ground were measured.

| | |
|---|---|
| 120°C. | 17 minutes |
| 150°C. | 6 minutes |
| 200°C. | 2 minutes |

2. Tensile shear strength (ASTM D-1002-64):

The composition was cured for 15 minutes at 150°C. on a cold rolled steel sheet within a hot air oven to form a test piece. It was found that the test piece had a tensile shear strength of 155 Kg/cm².

What we claim is:

1. A process for soldering an article, which comprises applying to the article to be soldered a fabricated article of a tacky, plastic and heat curable one-part epoxy resin soldering material composition consisting essentially of a mixture of 100 parts by weight of an epoxy resin having at least one epoxy group per molecule and 1 to 30 parts by weight of a normally solid imidazole compound having a long-chain alkyl group with at least 15 carbon atoms expressed by the formula:

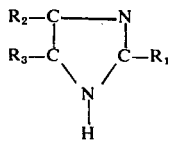

wherein $R_1$, $R_2$ and $R_3$ are a hydrogen atom or a hydrocarbon group, and at least one of $R_1$, $R_2$ and $R_3$ is a long-chain alkyl group having at least 15 carbon atoms, said fabricated article having a strippable backing film on one surface, pressing the fabricated article against the article to be soldered and bringing them into intimate adhesion to each other, extending the fabricated article, and heat-curing it with or without prior removal of the backing film.

2. The process of claim 1, wherein said epoxy resin soldering material composition further contains a curing agent or catalyst selected from the group consisting of aromatic polyamines, heterocyclic polyamines, urea derivatives, hydrazides, guanidine derivatives, and organic or inorganic acid salts thereof, which is active at high temperatures.

3. The process of claim 1, wherein said epoxy resin soldering material composition further contains an anti-corrosive pigment selected from the group consisting of a lead-containing inorganic anti-corrosive pigment, a metal chromate anti-corrosive pigment and a mixture thereof.

4. The process of claim 3, wherein said epoxy resin soldering material composition further contains a curing agent or catalyst selected from the group consisting of aromatic polyamines, heterocyclic polyamines, urea derivatives, hydrazides, guanidine derivatives and organic or inorganic acid salts thereof, which is active at high temperatures.

5. The process of claim 1, wherein said fabricated article of the epoxy resin soldering material composition is a sheet.

6. The process of claim 1, wherein said article to be soldered is a bonded part of an automobile body.

* * * * *